(12) United States Patent
Fiehn et al.

(10) Patent No.: US 10,830,633 B2
(45) Date of Patent: Nov. 10, 2020

(54) LOAD CELL FOR A SCALE WITH A SWITCHING DEVICE FOR CHANGING THE STATE OF CALIBRATION DATA WRITE PROTECTION

(71) Applicant: Bizerba SE & Co. KG, Balingen (DE)

(72) Inventors: Juergen Fiehn, Geislingen (DE);
Annika Schreiber, Balingen (DE);
Thomas Eger, Burladingen (DE)

(73) Assignee: Bizerba SE & Co. KG, Balingen (DE)

( * ) Notice: Subject to any disclaimer, the term of this patent is extended or adjusted under 35 U.S.C. 154(b) by 235 days.

(21) Appl. No.: 15/908,452

(22) Filed: Feb. 28, 2018

(65) Prior Publication Data

US 2018/0252570 A1  Sep. 6, 2018

(30) Foreign Application Priority Data

Mar. 2, 2017 (DE) .................. 10 2017 104 367

(51) Int. Cl.
*G01G 3/14* (2006.01)
*G01G 21/24* (2006.01)
(Continued)

(52) U.S. Cl.
CPC .......... *G01G 3/142* (2013.01); *G01G 3/1402* (2013.01); *G01G 21/244* (2013.01); *G01G 21/28* (2013.01);
(Continued)

(58) Field of Classification Search
CPC .... G01G 3/142; G01G 3/1402; G01G 21/244; G01G 21/28; G01G 23/01; G01G 23/017; G01G 23/015
See application file for complete search history.

(56) References Cited

U.S. PATENT DOCUMENTS 3,959,636 A * 5/1976 Johnson ................. G01G 19/38
700/84
4,332,174 A * 6/1982 Suzuki .................. G01G 3/1404
177/211
(Continued)

FOREIGN PATENT DOCUMENTS

CN       1111750 A    11/1995
CN     102374894 A     3/2012
(Continued)

OTHER PUBLICATIONS

Search Report of corresponding European Patent Application No. 18 15 7782.6 dated Aug. 1, 2018 (nine pages).
(Continued)

*Primary Examiner* — Randy W Gibson
(74) *Attorney, Agent, or Firm* — Kilpatrick Townsend & Stockton LLP (57) ABSTRACT

The present invention relates to a load cell for a scale having a monolithically configured measurement body that has a force reception section, a force introduction section, and a joint section arranged between the force reception section and the force introduction section, having at least one strain gauge arranged at the upper side on the joint section for detecting a stretching deformation of the measurement body, and having electronics that are arranged at the force reception side, that are at least partly arranged on a circuit board, and that have a memory in which calibration data of the load cell and/or a value for gravity are stored, wherein a hardware interface is provided via which the memory can be accessed and via which the calibration data stored in the memory and/or the value for gravity can be changed.

21 Claims, 4 Drawing Sheets

(51) Int. Cl.
*G01G 23/01* (2006.01)
*G01G 21/28* (2006.01)
*G01G 3/142* (2006.01)

(52) U.S. Cl.
CPC ............ *G01G 23/01* (2013.01); *G01G 23/017* (2013.01); *G01G 23/015* (2013.01)

(56) References Cited

U.S. PATENT DOCUMENTS

| | | | | |
|---|---|---|---|---|
| 4,430,716 A * | 2/1984 | Dlugos | ............... | G01G 19/005 177/25.15 |
| 4,748,858 A * | 6/1988 | Ort | ............... | G01B 7/20 73/766 |
| 4,763,740 A * | 8/1988 | Pattern | ............... | G01G 3/08 177/210 R |
| 4,799,559 A * | 1/1989 | Murdter | ............... | G01D 18/00 177/124 |
| 5,086,879 A * | 2/1992 | Latimer | ............... | A47F 9/046 186/61 |
| 5,141,066 A | 8/1992 | Strickler | | |
| 5,481,071 A * | 1/1996 | Wojnarski | ............... | G01G 23/00 177/124 |
| 5,623,128 A * | 4/1997 | Grimm | ............... | G01G 3/1406 177/211 |
| 5,723,826 A * | 3/1998 | Kitagawa | ............... | G01G 3/147 177/211 |
| 7,235,746 B2 * | 6/2007 | Williamson | ............... | G01G 19/44 177/126 |
| 8,561,482 B2 * | 10/2013 | Aumard | ............... | G01G 3/1412 73/862.627 |
| 8,664,546 B2 * | 3/2014 | Schon | ............... | G01G 23/017 177/124 |
| 8,716,612 B2 * | 5/2014 | Schon | ............... | G01G 21/30 174/559 |
| 2016/0047702 A1 | 2/2016 | Bodmer et al. | | |
| 2016/0342969 A1 * | 11/2016 | Perez Jacome | ............... | G01M 1/122 |
| 2018/0252571 A1 * | 9/2018 | Schreiber | ............... | G01G 3/1404 |

FOREIGN PATENT DOCUMENTS

| | | |
|---|---|---|
| CN | 103292888 A | 9/2013 |
| CN | 103557923 A | 2/2014 |
| CN | 203551079 U | 4/2014 |
| CN | 104374453 A | 2/2015 |
| CN | 204422034 U | 6/2015 |
| DE | 103 59 460 A1 | 7/2005 |
| DE | 10 2010 043 287 A1 | 5/2012 |
| DE | 10 2014 112 415 A1 | 3/2013 |
| DE | 10 2014 111 682 A1 | 2/2016 |
| EP | 0 670 479 A1 | 9/1995 |
| EP | 2 416 130 B1 | 8/2010 |
| EP | 2 416 130 A1 | 2/2012 |

OTHER PUBLICATIONS

German Search Report in related German Patent Application No. 10 2017 104 367.5 dated Jul. 5, 2017 (two pages).
Chinese Office Action dated Aug. 27, 2020 in related Chinese Patent Application No. 201810170754X (15 pages).

* cited by examiner

LOAD CELL FOR A SCALE WITH A SWITCHING DEVICE FOR CHANGING THE STATE OF CALIBRATION DATA WRITE PROTECTION

This application claims priority to German Application No. 102017104367.5, filed Mar. 2, 2017, the disclosure of which is incorporated by reference herein.

The present invention relates to a load cell for a scale having a monolithically configured measurement body that has a force reception section, a force introduction section, and a joint section arranged between the force reception section and the force introduction section, having at least one strain gauge arranged at the upper side on the joint section for detecting a stretching deformation of the measurement body, and having electronics that are arranged at the force reception side, that are at least partly arranged on a circuit board, and that have a memory in which calibration data of the load cell and/or a value for gravity are stored, wherein a hardware interface is provided via which the memory can be accessed and via which the calibration data stored in the memory and/or the value for gravity can be changed. The measurement body in particular has a longitudinal axis and an axial end at the force reception side and an axial end at the force introduction side. The electronics in particular have an analog-to-digital converter for processing at least one output signal of the at least one strain gauge. The electronics are in particular electrically connected to the at least one strain gauge and/or the hardware interface is electrically connected to the electronics.

Load cells are initially calibrated in the factory prior to shipping. For this purpose, calibration weights are e.g. used to determine measured value deviations of the load cell from the known weight of the calibration weights and the electronics of the load cell, in particular a measurement amplifier of the load cell, are subsequently set or balanced such that the known weight of the calibration weights is correctly displayed on a display of the scale. Corresponding calibration data are stored in a memory of the load cell in this process. Since the weight determined by a scale and the calibration data depend on the installation site of the scale, that is on the height above sea level and on the latitude, the value of gravity present at the installation site of the scale can also be stored in the memory.

Scales subject to calibration or load cells subject to calibration have to be calibrated, i.e. have to be subjected to a specific inspection prescribed by law for the observation of underlying regulations concerning weights and measures, in particular calibration tolerances. The carrying out of a calibration is indicated by a calibration mark. The calibration data and/or the value for gravity may then no longer be changed. For this purpose, the calibration mark is affixed such that it necessarily has to be destroyed if the memory is accessed, whereby the scale or the load cell loses its calibration, i.e. is decalibrated.

It is, however, recommended to recalibrate the scale regularly to compensate time drifts or long-term influences, for which purpose the memory has to be accessed to store correspondingly changed calibration data. It can furthermore be necessary to access the memory to change the value for gravity if the scale is installed at a different site than the previous one. A recalibration is as a rule not necessary here since the calibration data can be converted into one another for different gravity values. Such changes to the data stored in the memory can be carried out by persons authorized for this purpose, in particular state-registered maintenance engineers such as service engineers of the manufacturer, who subsequently provide the scale or the load cell with a maintenance mark so that the validity of the calibration is maintained.

It is known from the prior art to provide a hardware interface for access to the memory which is arranged on the circuit board and via which the memory can be accessed. A metal hoop is furthermore provided which is fastened at one end to the housing of the scale by means of a fastening screw and whose free end extends toward the load cell to cover at least the hardware interface of the circuit board in a manner inaccessible from the outside. The fastening screw is secured by a calibration mark here.

Such a cover for the hardware interface associated with the memory is, however, comparatively solid and bulky.

It is the underlying object of the invention to provide a more manageable possibility of protecting the memory of the load cell of the initially named kind against an unauthorized manipulation, with authorized changes also still being possible.

This object is satisfied by a load cell having the features of claim 1 and in particular in that an electronic write protection is provided for the memory, wherein the electronics comprise a switching device that is in particular arranged on the circuit board to deactivate the write protection, and wherein a removable cover, in particular a calibration cover and/or a cover plate, is provided that is fastened, in particular at the upper side, to the force reception section of the measurement body by means of a fastening element, in particular a fastening screw, secured by a calibration mark and that covers the switching device in a manner inaccessible from the outside.

A cover for the hardware interface associated with the memory and in particular arranged on the circuit board is thus not necessary at all to protect the memory from an unauthorized manipulation. The hardware interface can rather be freely accessible from outside the load cell. In accordance with the invention, the protection of the memory from an unauthorized manipulation takes place in that the memory is electronically write protected and the write protection can be canceled, can in particular only be canceled, by a switching device that is covered by a cover secured by a calibration mark in a manner inaccessible from the outside. The cover is furthermore not fastened to the housing of the scale, but rather to the load cell itself. Changes to the data which are stored in the memory, which are in particular calibration-related, and which can also comprise data going beyond the aforesaid data in the form of calibration data and/or of the value for gravity can in particular also still be carried out by deactivating the write protection by a person authorized to do so.

The switching device is preferably a sensor. The write protection can be automatically deactivated by a sensor.

The sensor is preferably configured to detect a removal of the fastening element from its fastened position, in particular an unscrewing of the fastening screw, and in particular only to output a switching signal to deactivate the write protection of the memory after detecting a removal of the fastening element. As long as the fastening means is in its fastened position, the memory with the calibration data and/or the value for gravity is write protected.

In accordance with a preferred embodiment of the invention, the sensor is a light barrier having a transmitter and a receiver that is arranged such that the optical path and/or the light beam between the transmitter and the receiver is interrupted when the fastening element, in particular the fastening screw for the cover, is in its fastened position and is configured to output a switching signal to deactivate the write protection of the memory when the optical path between the transmitter and the receiver is no longer interrupted by the fastening element. If the fastening element is removed and if a switching signal is correspondingly output, it can be stored in the scale, in particular in the load cell, in particular in said memory, that the scale or the load cell has been decalibrated. The scale or the load cell is then no longer calibrated, even if the fastening element is later again returned into its fastened position so that the light barrier is interrupted again. Such a sensor also has the advantage that a sensor defect which may also have been caused by manipulation under certain circumstances and on which light is no longer radiated by the transmitter does not result in an accidental release of the write protection.

A diaphragm can in particular be provided behind which the light barrier is arranged to keep light incident from the outside away from the light barrier. It can hereby be prevented that a switching signal of the light barrier is triggered by a manipulative radiation of light onto the receiver of the light barrier even though the fastening means, in particular the fastening screw for the cover, is still in its fastened position.

Alternatively, the switching device can also be a manually actuable switch or a manually actuated electrical component. If the switch is installed on the lower side of the conductor board, with the cover covering the circuit board from above, the switch has to be operated through an opening in the circuit board. The fastening element and the cover are removed, for example, and the switch is subsequently actuated by means of a screwdriver through the opening in the circuit board. Provision can be made in this connection that the calibration cover is provided with a flap in the region of the fastening element that can only be opened when the fastening element has been removed so that the switch is more easily accessible.

The cover can be produced from plastic. The cover can be formed as a cover plate. The calibration mark can be a sticker, in particular in Europe, or a calibration seal, in particular in the USA.

The fastening screw is preferably screwed into a hole, in particular a blind hole, that is formed, in particular at the upper side, in the force receiving section and that has an internal thread, with the fastening screw extending through a passage hole provided in the cover and through a corresponding passage hole provided in the circuit board and, optionally, through a corresponding passage hole provided in a protective cover. The hole can in particular be formed, in particular at the upper side, in a recess provided in the force reception section.

The force reception section can have a recess, in particular bounded at three sides, at its upper side that is open, in particular exclusively open, toward an end of the measurement body at the force reception side and into which the circuit board is inserted horizontally and which is covered from above by the cover. Due to the arrangement of the circuit board on the upper side of the force reception section, the height of the measurement body and thus the construction height of the load cell can be selected independently of the dimensions of the circuit board. The circumstance that the circuit board is inserted into a recess additionally contributes to the construction height of the load cell being able to be kept small. This in particular applies when the circuit board is arranged completely sunk in the recess.

The hardware interface is preferably arranged at the side of the circuit board facing the end of the measurement body at the force reception side and/or is freely accessible from outside the load cell, with the hardware interface preferably projecting outwardly beyond the end of the measurement body at the force reception side and/or preferably being configured as part of a plug-in connection whose plug-in direction extends horizontally, in particular along a longitudinal axis of the measurement body. The hardware interface can be simply contacted by the provision of the hardware interface via the end of the measurement body at the force reception side. This in particular applies when the respective plug-in connection is a latching plug-in connection that requires the pressing of a tab to release the plug-in connection again. In addition to the hardware interface that is associated with the memory and that can, for example, be configured as a USB interface, a further hardware interface can be provided, for example a USB interface, that is configured to connect the circuit board to a CPU board of the scale that is configured to process the signals, in particular weight value signals, provided by the electronics.

A protective cover can be provided for the circuit board, in particular for a populated side of the circuit board, with the circuit board being combined with the protective cover to form a module that is inserted into the recess, in particular with the populated side of the circuit board and/or of the protective cover facing downwardly. The electronics arranged on the circuit board, in particular the memory and/or an analog-to-digital converter, can be well-protected from damage by the protective cover.

It is preferred for the protective cover to have at least one fixing spigot that projects in the direction of and beyond the circuit board and for the cover to have at least one fixing hole for receiving the respective fixing spigot projecting from a protective cover, with the circuit board preferably having a cut-out in the region of the respective fixing spigot. The cover can hereby be aligned relative to the protective cover or the circuit board.

The circuit board and the protective cover can be mechanically connected to one another via a clip connection that is in particular releasable. A simple and in particular releasable connection can hereby be provided. The protective cover preferably has a plurality of bending snap-fit hooks that project in the direction of the circuit board, in particular beyond it, and that engage behind the circuit board in a shape-matched manner in the assembled state to form the clip connection.

The cover preferably has reception holes for receiving the bending snap-fit hooks that project from the protective cover and that protrude beyond the circuit board. The circumstance that the bending snap-fit hooks can extend through the cover contributes to the construction height of the load cell being able to be kept small.

An alignment of the cover relative to the protective cover can furthermore hereby also be achieved.

The cover can furthermore have a pin that projects in the direction of the circuit board, that extends through a passage hole provided in the circuit board and that is supported on the protective cover, in particular on a counter-pin of the protective cover, to hold the cover at a spacing from the circuit board.

In accordance with a preferred embodiment of the invention, the force reception section preferably has at least one fastening hole for a respective fastening means, in particular a respective screw, for fastening the load cell to a scale, with the cover simultaneously also covering the respective fastening hole and/or the respective fastening means since the respective fastening hole and/or the respective fastening means are also generally calibration-relevant in a calibrated scale. The force reception section can in particular have a plurality of fastening holes for fastening the load cell to a scale that are arranged at both sides of the recess and/or at both sides of the circuit board with respect to the longitudinal axis of the measurement body.

The present invention furthermore relates to a scale having a load cell as has been described above.

Further advantageous embodiments of the invention are described in the claims, in the description of the Figures and in the drawing.

The invention will be described in the following by way of example with reference to the drawing. There are shown FIG. 1 a perspective view of a load cell in accordance with the invention without an inserted circuit board.

Figure 1:
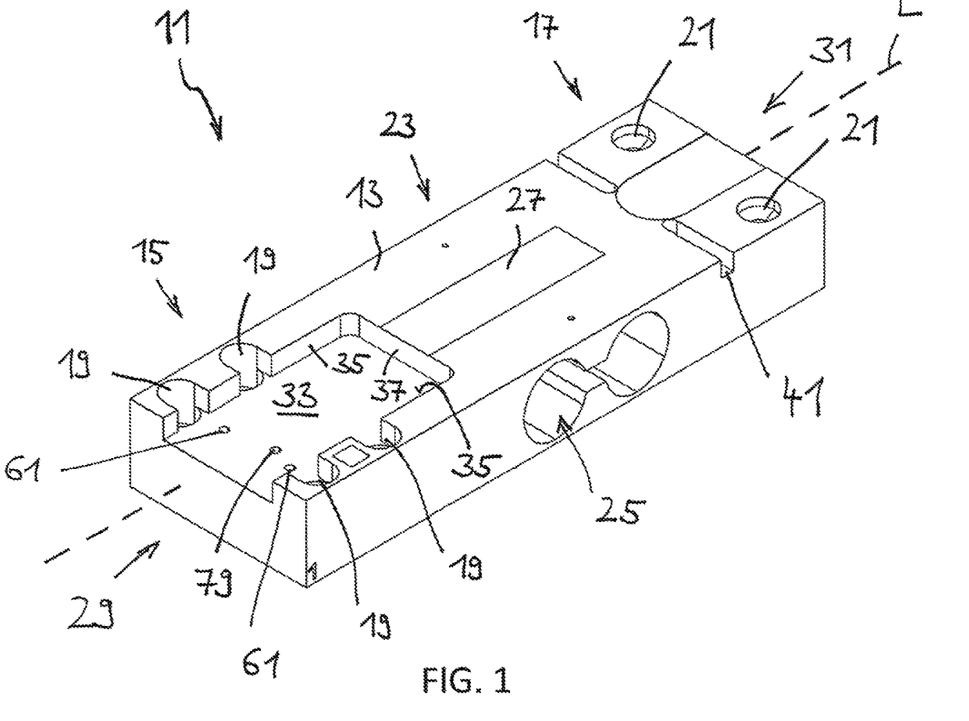

A load cell 11 is shown in FIG. 1 for a calibrated scale that comprises a measurement body 13 that is formed monolithically as a block and that has a force reception section 15 and a force introduction section 17. The force reception section 15 is fastenable to the scale via four fastening holes 19 and a load cross-piece bearing a load plate is fastenable (not shown) to the force introduction section via two fastening holes 21. A joint section 23 is provided between the two sections 15, 17 so that the measurement body 13 acts as a bending bar or as a bending beam. For this purpose, a central passage 25 is formed in the joint section 23; it is in particular dog-bone-shaped in cross-section and completely passes through the measurement body 13. The measurement body 13 overall has a longitudinal axis L, an end 29 at the force reception side, and an end 31 at the force introduction side. A groove 41 extending perpendicular to the longitudinal axis L is provided at the upper side of the measurement body 13 between the force introduction section 17 and the joint section 23 to achieve a mechanical decoupling of the force introduction section 17.

A plurality of only schematically shown strain gauges 27 are arranged above the passage 25 at the outer side of the measurement body 13 and detect a deformation of the measurement body 13 in a manner known per se in the region of the joint section 23. The load cell 11 is therefore a strain gauge load cell. A load on the force introduction section 17 produces a deflection or bending of the measurement body 13 proportional thereto so that the weight of the load can be determined from the deflection or from a stretching of the measurement body 13.

A rectangular recess 33 is formed at the upper side in the force reception section 15 and is bounded by two longitudinal side walls 35 extending in the direction of the longitudinal axis L of the measurement body 13 and oppositely disposed with respect to the longitudinal axis L and by a front side wall 37 facing the end 31 at the force introduction side. The recess 33 is open toward the end 29 of the measurement body 13 at the force reception side. The recess 33 is in this respect arranged with respect to the longitudinal axis L centrally between two fastening holes 19 toward its one longitudinal side and two fastening holes 19 toward its other longitudinal side.

Figure 2:
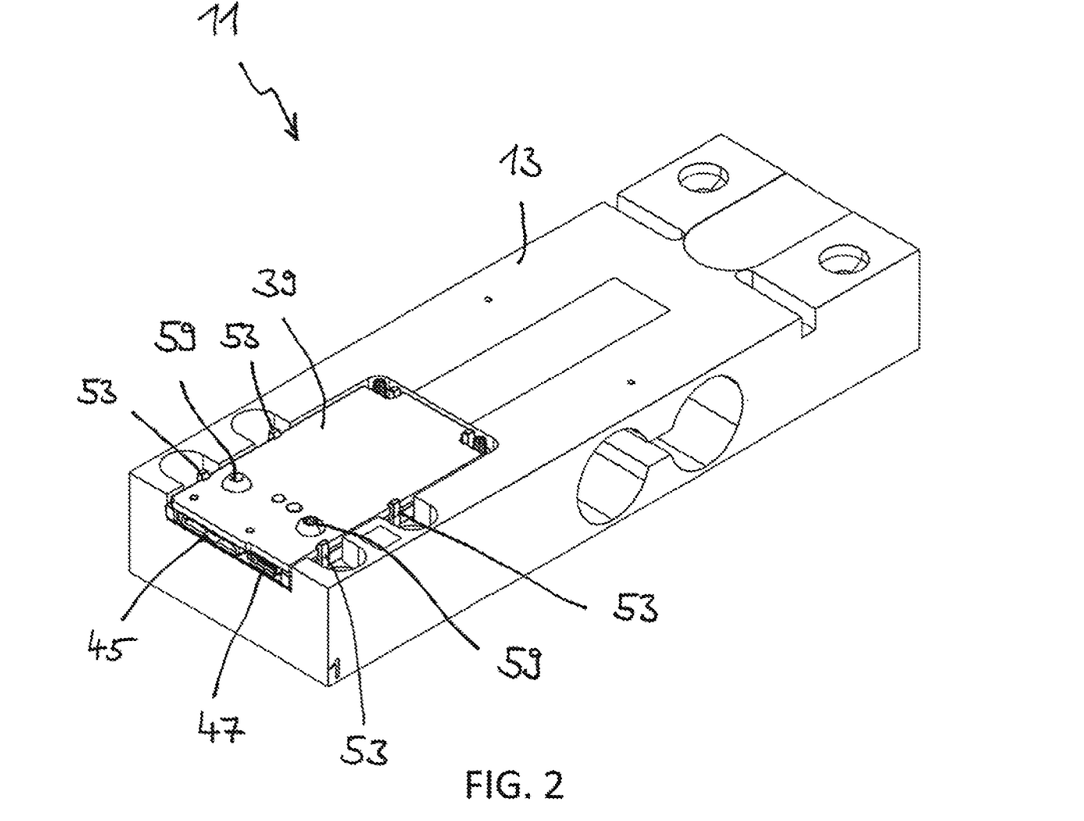
FIG. 2 the load cell of FIG. 1 with an inserted circuit board.

A circuit board 39 is inserted horizontally into the recess 33, as is shown in FIG. 2.

The circuit board 39 is electrically connected to the strain gauges 27 via bonding wires, not shown, and is populated with a plurality of electronic assemblies of electronics 43 that in particular comprise an analog-to-digital converter 89.

The electronics 43 are provided for the signal processing of at least one output signal of the strain gauge 27 that in particular forms a Wheatstone bridge, in particular for calculating a weight value.

Figure 3:
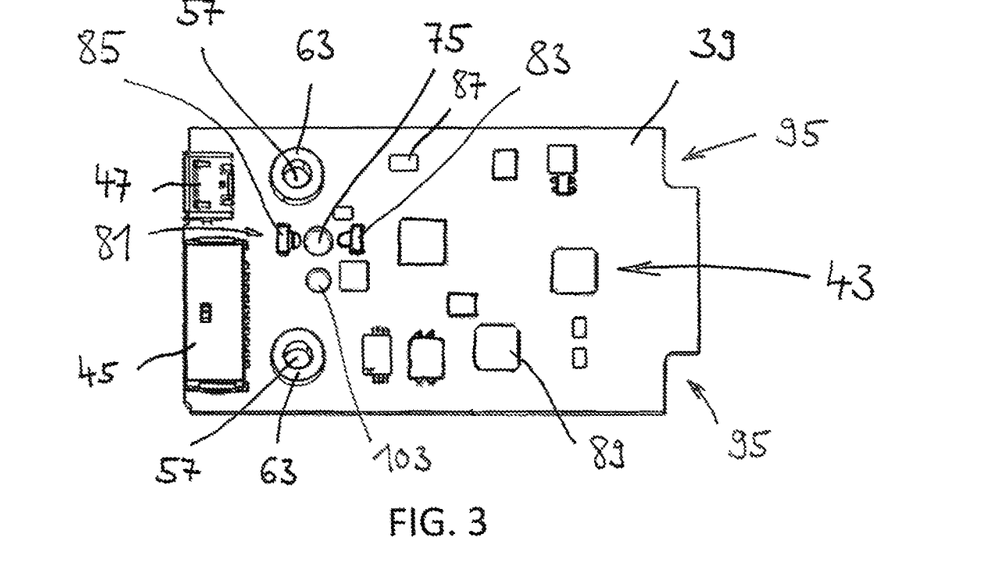
FIG. 3 the circuit board of FIG. 2 in a view from below.

The circuit board 39 is only populated on one side so that the circuit board 39 has a mounting side, that is shown in FIG. 3, and a solder side. The circuit board 39 is inserted into the recess 33 in the manner of overhead installation with its populated side facing downwardly so that its solder side faces upwardly so that the aforesaid bond connection between the circuit board 39, namely its solder side, and the strain gauges 27 can be established particularly simply. The fact that the upper side of the circuit board 39 is admittedly completely sunk into the recess, but is only arranged just beneath the upper side of the joint section 23 also contributes to this.

A load cell 11 having a small construction height can be implemented by the arrangement of the circuit board 39 in the recess 33 at the upper side of the measurement body 13.

The circuit board 39 has two hardware interfaces 45, 47 at its side facing the end 29 of the measurement body 13 at the force reception side; they are electrically connected to the electronics 43, are formed as respective sockets of a plug-in connection, and are freely accessible from outside the load cell 11 so that the respective associated plugs can be plugged into the sockets 45, 47 along the longitudinal axis L of the measurement body 13 or can be released therefrom. The hardware interface 45 is a serial interface via which a balance of the load cell 11 is possible during the manufacture of the load cell 11. Calibration data of the load cell 11 are in this respect in particular stored in a calibration-enabled memory 87 of the electronics 43, with an electronic write protection subsequently being activated to prevent a later unauthorized manipulation of the calibration data. The hardware interface 47 is a USB interface via which the weight value calculated by the electronics 43 can be read by a CPU board external to the load cells, not shown, or can be output to it.

As can be rudimentarily recognized in FIG. 2, the circuit board 39 and the two hardware interfaces 45, 47 project outwardly over the end 29 of the measurement body 13 at the force reception side to further facilitate the accessibility to the hardware interfaces 45, 47.

Figure 4:
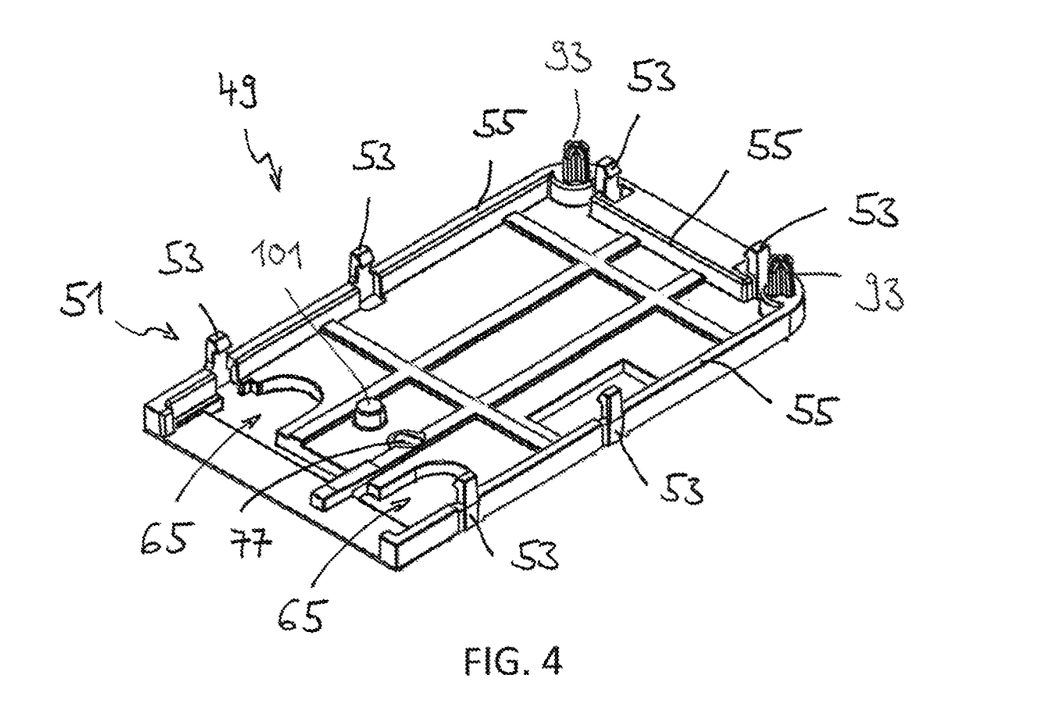
FIG. 4 a perspective view of a protective cover for the circuit board.

A protective cover 49 that is shown in FIG. 4 is provided to protect the electronics 43. The protective cover 49 is combined with the circuit board 39 via a releasable mechanical clip connection 51 to form a module, with the circuit board 39 being inserted into the recess 33 together with the protective cover 49, and indeed with the populated side of the circuit board 39 or of the protective cover 49 at the front. The clip connection 51 is formed in that the protective cover 49 has a plurality of bending snap-in hooks 53 that project in the direction of the circuit board 39 and that engage with shape matching behind the upper side of the circuit board 39. The circuit board 39 is in this respect on a web 55 of the protective cover 49 projecting in the direction of the circuit board 39, said web being formed at the two longitudinal sides and at the front side of the protective cover 49 facing the end 31 at the force introduction side.

The protective cover 49 is in contrast web-free at its front side facing the end 29 of the measurement body 13 at the force reception side since the two hardware interfaces 45, 47 are arranged there that are accessible from the outside, as is explained above.

The circuit board 39 has two passage holes 57 (FIG. 3) via which the circuit board 39 is fastened by means of two fastening screws 59 (FIG. 2) in corresponding blind holes 61

(FIG. 1) formed in the recess 33 and each having an internal thread. The fastening screws 59 respectively extend here through the interior of a respective spacer sleeve 63 that respectively projects downwardly from the lower side of the circuit board 39, that engages through a corresponding respective cut-out 65 in the protective cover 49, and that sits on the base of the recess 33.

Furthermore, a calibration cover 67 (FIG. 5) is provided that is fastened by means of a fastening screw 69 to the load cell 11 and that at least partly covers the recess 33 and thus the circuit board 39 and the two fastening screws 59 from above and thus inaccessibly from the outside.

The fastening screw 69 is screwed in a blind hole 79 formed in the recess 33 and having an internal thread. For this purpose, the fastening screw 69 extends through a passage hole 73 formed in the calibration cover 67 and covered by the fastening screw 69 in FIG. 5, through a passage hole 75 formed in the circuit board 39, and through a passage hole 77 formed in the protective cover 49, with the three passage holes 73, 75, 77 being arranged in alignment with one another in the direction perpendicular to the surface of the measurement body 13.

Figure 5:
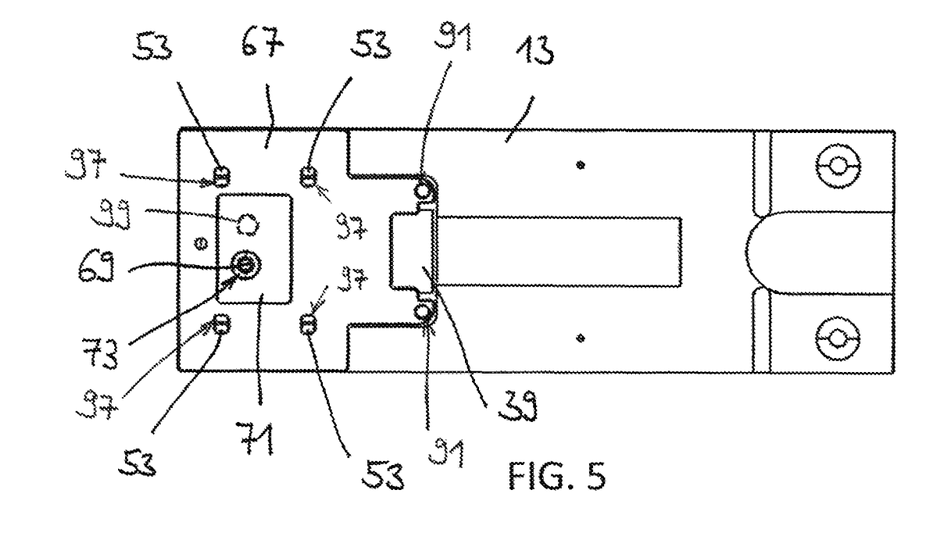
FIG. 5 a plan view of the load cell in accordance with FIGS. 1 and 2 with a calibration cover.

The presence of the fastening screw 69 can be recognized by a light barrier 81 attached to the lower side of the circuit board 39 and covered inaccessibly from the outside by the calibration cover 67. For this purpose, the transmitter 83 and the receiver 85 of the light barrier 81 are arranged on two mutually oppositely disposed sides of the passage hole 75 formed in the circuit board 39 so that the light barrier 81 is interrupted by the screwed-in fastening screw 69. The light barrier 81 is configured such that a switch signal is generated when the light barrier 81 is no longer interrupted by the fastening element 69, i.e. when the fastening screw 69 is unscrewed.

The switch signal of the light barrier 81 is used to cancel the above-explained electronic write protection of the memory 87 having the calibration data of the load cell as is required for a permitted recalibration of the load cell 11.

Since the calibration cover 67 is provided with a calibration mark 71 in the form of a sticker that is shown as transparent and that is adhesively bonded to the fastening screw 69 for the calibration cover 67, a determination can be made by a visual check if the fastening screw 69 for the calibration cover 67 has been removed since the calibration mark 71 is then necessarily destroyed. If the fastening screw 69 is removed by an authorized person, the validity of the calibration is, however, maintained, which is in particular made visible in that the load cell 11 is provided with a maintenance mark.

As can further be recognized from FIG. 5, not only the recess 33 is covered by the calibration cover 67, but additionally also the fastening holes 19 via which the load cell 11 is fastenable to a fixed part of a scale by means of screws and said screws are covered so that it is also recognizable when this fastening has been accessed.

Furthermore, two fixing holes 91 and four reception holes 97 are formed in the calibration cover 67. A respective fixing spigot 93 for the calibration cover 67 engages into the fixing holes 91 and projects from the protective cover 49 in each case beyond the circuit board 39 in the direction of the calibration cover 67, with the fixing spigots 93 not being shown in FIG. 5 for reasons of clarity. The circuit board 39 has a cut-out 95 in the respective region. Four bending snap-in hooks 53 that project from the protective cover 49 and protrude beyond the circuit board 39 engage into the four reception holes 97.

Finally, an alignment device is provided to align the protective cover 49 relative to the calibration cover 67. For this purpose, a pin 99 is provided at the lower side of the calibration cover 67 that projects in the direction of the protective cover 49 and this is not visible per se in FIG. 5 and is therefore shown in a dashed representation. The pin 99 extends through a passage opening 103 formed in the circuit board 39 and cooperates with a counter-pin 101 provided at the protective cover 49 to prevent the calibration cover 67 from being pressed onto the circuit board 39 on the screwing tight of the fastening screw 69.

REFERENCE NUMERAL LIST 11 load cell
13 measurement body
15 force reception section
17 force introduction section
19 fastening hole
21 fastening hole
23 joint section
25 passage
27 strain gauge
29 end
31 end
33 recess
35 longitudinal side wall
37 front side wall
39 circuit board
41 groove
43 electronics
45 hardware interface
47 hardware interface
49 protective cover
51 clip connection
53 bending snap-in hook
55 web
57 passage hole
59 fastening screw
61 blind hole
63 spacer sleeve
65 cut-out
67 calibration cover
69 fastening screw
71 calibration mark
73 passage hole
75 passage hole
77 passage hole
79 blind hole
81 light barrier
83 transmitter
85 receiver
87 memory
89 analog-to-digital converter
91 fixing hole
93 fixing spigot
95 cut-out
97 reception hole
99 pin
101 counter-pin
103 passage opening
L longitudinal axis

The invention claimed is:
1. A load cell for a scale, the load cell comprising:
a monolithically configured measurement body comprising:
a force reception section;

a force introduction section; and
a joint section arranged between the force reception section and the force introduction section;
at least one strain gauge coupled to an upper side of the joint section configured to detect a stretching deformation of the measurement body;
electronics arranged on the force reception section and at least partly forming a portion of a circuit board, wherein the electronics are electrically coupled to the at least one strain gauge, and wherein the circuit board comprises a hardware interface electrically coupled to the electronics, wherein the electronics further comprise:
a memory configured to store data comprising calibration data of the load cell and/or a value for gravity, wherein the memory comprises electronic write protection configured to be transitioned between an activated electronic write protection state wherein the stored data cannot be changed, and a deactivated electronic write protection state wherein the stored data can be changed; and
a switching device configured to transition the memory from the activated electronic write protection state and to the deactivated electronic write protection state;
a removable cover coupled to the force reception section of the measurement body with a fastening element extending through the removable cover; and
a calibration mark coupled to the fastening element and configured so that removal of the fastening element from the removable cover destroys the calibration mark;
wherein the hardware interface is electronically coupled to the electronics so the stored data can be changed via the hardware interface when the memory is in the deactivated electronic write protection state;
wherein the removable cover and the fastening element are configured to transition the switching device from an inaccessible state to an accessible state,
wherein in the inaccessible state the switching device cannot transition the memory from the activated electronic write protection state to the deactivated electronic write protection state,
wherein in the accessible state the switching device can transition the memory from the activated electronic write protection state to the deactivated electronic write protection state,
wherein with the removable cover coupled to the force reception section with the fastening element the switching device is in the inaccessible state, and
wherein removal of the fastening element and the removable cover, or removal of the fastening element from the removable cover cause the calibration mark to be destroyed and cause a transition of the switching device from the inaccessible state to the accessible state.

2. The load cell in accordance with claim 1, wherein the fastening element is a fastening screw.

3. The load cell in accordance with claim 1, wherein the switching device is a sensor or a manually actuable switch.

4. The load cell in accordance with claim 3, wherein the sensor is configured to detect a removal of the fastening element from its fastened position and to output a switching signal to switch the memory from the activated write protection state to the deactivated write protection state after detecting a removal of the fastening element.

5. The load cell in accordance with claim 3, wherein the fastening element is a fastening screw and the sensor is configured to detect an unscrewing of the fastening screw.

6. The load cell in accordance with claim 4, wherein the sensor is a light barrier having a transmitter and a receiver that is arranged such that the optical path between the transmitter and the receiver is interrupted when the fastening element is in its fastened position and that is configured to output a switching signal to switch the memory from the activated write protection state to the deactivated write protection state when the optical path between the transmitter and the receiver is no longer interrupted by the fastening element.

7. The load cell in accordance with claim 6, wherein a diaphragm is provided behind which the light barrier is arranged to keep light incident from the outside away from the light barrier.

8. The load cell in accordance with claim 2, wherein the fastening screw is screwed into a hole that is formed in the force reception section and that has an internal thread, with the fastening screw extending through a passage hole provided in the cover, through a corresponding passage hole provided in the circuit board, and through a corresponding passage hole provided in a protective cover.

9. The load cell in accordance with claim 1, wherein the force reception section has a recess at the upper side which is open toward an end of the measurement body at the force reception section, into which the circuit board is inserted horizontally, and which is covered from above by the removable cover.

10. The load cell in accordance with claim 9, wherein the circuit board is completely sunk into the recess.

11. The load cell in accordance with claim 1, wherein the hardware interface is arranged at the side of the circuit board facing the end of the measurement body at the force reception section and/or is freely accessible from outside the load cell.

12. The load cell in accordance with claim 11, wherein the hardware interface projects outwardly beyond the end of the measurement body at the force reception section.

13. The load cell in accordance with claim 11, wherein the hardware interface is configured as part of a plug-in connection whose plug-in direction extends horizontally.

14. The load cell in accordance with claim 9, wherein a protective cover is provided for the circuit board, with the circuit board being combined with the protective cover to form a module that is inserted into the recess.

15. The load cell in accordance with claim 14, wherein the protective cover has at least one fixing spigot projecting in the direction of and beyond the circuit board and the cover has at least one fixing hole for receiving the respective fixing spigot projecting from a protective cover.

16. The load cell in accordance with claim 14, wherein the circuit board and the protective cover are mechanically connected to one another via a clip connection.

17. The load cell in accordance with claim 16, wherein the protective cover has a plurality of bending snap-in hooks that project in the direction of the circuit board and that engage behind the circuit board with shape matching in the assembled state to form the clip connection.

18. The load cell in accordance with claim 17, wherein the protective cover has reception holes for receiving at least some of the bending snap-in hooks projecting from the protective cover and protruding beyond the circuit board.

19. The load cell in accordance with claim 14, wherein the protective cover has at least one pin that projects in the direction of the circuit board, that extends through a passage opening provided in the circuit board, and that is supported on the protective cover.

20. The load cell in accordance with claim 14, wherein the force reception section has at least one fastening hole for a respective fastening means for fastening the load cell to a scale, with the protective cover simultaneously also covering the respective fastening hole and/or the respective fastening means.

21. A scale having a load cell, the load cell comprising:
a monolithically configured measurement body comprising:
   a force reception section;
   a force introduction section; and
   a joint section arranged between the force reception section and the force introduction section;
   at least one strain gauge coupled to an upper side of the joint section configured to detect a stretching deformation of the measurement body;
   electronics arranged on the force reception section and at least partly forming a portion of a circuit board, wherein the electronics are electrically coupled to the at least one strain gauge, and wherein the circuit board comprises a hardware interface electrically coupled to the electronics, wherein the electronics further comprise:
   a memory configured to store data comprising calibration data of the load cell and/or a value for gravity, wherein the memory comprises electronic write protection configured to be transitioned between an activated electronic write protection state wherein the stored data cannot be changed, and a deactivated electronic write protection state wherein the stored data can be changed; and
      a switching device configured to transition the memory from the activated electronic write protection state and to the deactivated electronic write protection state;
a removable cover coupled to the force reception section of the measurement body with a fastening element extending through the removable cover; and
a calibration mark coupled to the fastening element and configured so that removal of the fastening element from the removable cover destroys the calibration mark;
wherein the hardware interface is electronically coupled to the electronics so the stored data can be changed via the hardware interface when the memory is in the deactivated electronic write protection state;
wherein the removable cover and the fastening element are configured to transition the switching device from an inaccessible state to an accessible state,
wherein in the inaccessible state the switching device cannot transition the memory from the activated electronic write protection state to the deactivated electronic write protection state,
wherein in the accessible state the switching device can transition the memory from the activated electronic write protection state to the deactivated electronic write protection state,
wherein with the removable cover coupled to the force reception section with the fastening element the switching device is in the inaccessible state, and
wherein removal of the fastening element and the removable cover, or removal of the fastening element from the removable cover cause the calibration mark to be destroyed and cause a transition of the switching device from the inaccessible state to the accessible state.

* * * * *